United States Patent
Ozer et al.

(10) Patent No.: US 10,628,277 B2
(45) Date of Patent: Apr. 21, 2020

(54) DEVICE, SYSTEM AND PROCESS FOR REDUNDANT PROCESSOR ERROR DETECTION

(71) Applicant: ARM Ltd., Cambridge (GB)

(72) Inventors: Emre Ozer, Buckden (GB); Xabier Iturbe, Cambridge (GB); Balaji Venu, Cambridge (GB)

(73) Assignee: ARM Ltd., Cambridge (GB)

( * ) Notice: Subject to any disclaimer, the term of this patent is extended or adjusted under 35 U.S.C. 154(b) by 125 days.

(21) Appl. No.: 15/940,477

(22) Filed: Mar. 29, 2018

(65) Prior Publication Data

US 2019/0303260 A1 Oct. 3, 2019

(51) Int. Cl.
| | | |
|---|---|---|
| *G06F 11/00* | (2006.01) | |
| *G06F 11/27* | (2006.01) | |
| *G06F 11/22* | (2006.01) | |
| *G06F 11/16* | (2006.01) | |

(52) U.S. Cl.
CPC ......... *G06F 11/27* (2013.01); *G06F 11/1641* (2013.01); *G06F 11/2236* (2013.01)

(58) Field of Classification Search
CPC .. G06F 11/27; G06F 11/2236; G06F 11/0724; G06F 11/1608; G06F 11/1629; G06F 11/1641
See application file for complete search history.

(56) References Cited

U.S. PATENT DOCUMENTS

| | | | | |
|---|---|---|---|---|
| 5,923,830 A | * | 7/1999 | Fuchs | G06F 11/1641 714/11 |
| 2002/0077782 A1 | * | 6/2002 | Fruehling | G06F 11/1008 702/185 |
| 2002/0144177 A1 | | 10/2002 | Kondo et al. | |
| 2004/0019771 A1 | * | 1/2004 | Quach | G06F 11/1641 712/229 |
| 2006/0107117 A1 | * | 5/2006 | Michaelis | G06F 11/1658 714/25 |
| 2011/0209021 A1 | * | 8/2011 | Sorensen | A61B 7/00 714/733 |
| 2014/0157073 A1 | * | 6/2014 | Douskey | G01R 31/3177 714/732 |
| 2016/0349322 A1 | * | 12/2016 | Shibahara | G01R 31/3177 |
| 2017/0351577 A1 | | 12/2017 | Scobie et al. | |

(Continued)

OTHER PUBLICATIONS

Dr. Wolfgang Freese, "On the meaning of Fault Tolerant Time Interval (FTTI)", published Apr. 15, 2017, https://www.linkedin.com/pulse/meaning-fault-tolerance-time-interval-ftti-dr-wolfgang-freese-1, pp. 1-7.

(Continued)

*Primary Examiner* — Joseph D Manoskey
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, to determine indicators of potential errors in a multi-processing core lockstep computing device comprising a plurality of processing cores, based, at least in part, on observations of output signals generated by at least two processing cores of the plurality of processing cores. A built-in self-test (BIST) procedure may then be based, at least in part, on the determining indicators.

19 Claims, 13 Drawing Sheets

(56) References Cited

U.S. PATENT DOCUMENTS

2019/0171536 A1\* 6/2019 Refaeli ................ G06F 11/203

OTHER PUBLICATIONS

Matthew Beecham, "Robert Bosch Automotive Steering on electrification and automated driving", Mar. 13, 2017, Published by Aroq Ltd. Aroq House, 17A Harris Business Park, Bromsgrove, Worcs,B60 4DJ, UK, Registered in England No. 4307068, 2 pgs.
Alison Young, "Microcontroller Architecture Options for Fault Tolerant Systems", Jan. 20, 2016, Secure Connections for Smarter World, 15pgs.
He, et al, "Hybrid BIST Test Scheduling Based on Defect Probabilities," Test Symposium, 2004, 13th Asian Keating, Taiwan, Nov. 15-17, 2004, Piscataway, NJ, USA, IEEE, pp. 230-235.
Notification of Transmittal of the International Search Report and the Written Opinion of the International Searching Authority, or the Declaration, App. No. PCT/GB2019/050758, dated Jun. 18, 2019, 1 Page.
International Search Report, App. No. PCT/GB2019/050758, dated Jun. 18, 2019, 5 Pages.
Written Opinion of the International Searching Authority, App. No. PCT/GB2019/050758, dated Jun. 18, 2019, 10 Page.

\* cited by examiner

| $700_1$ | | | $700_2$ | | | $700_n$ | |
|---|---|---|---|---|---|---|---|
| DPU:BR | 0.9 | | MPU | 0.8 | | Icache | 0.7 |
| ⋮ | | | ⋮ | | | ⋮ | |
| AXIM | 0.5 | | PFU | 0.7 | | Dache | 0.6 |
| LSU | 0.3 | | Icache | 0.1 | | PFU | 0.2 |

FIG. 7

| $800_1$ | | | $800_2$ | | | $800_n$ | |
|---|---|---|---|---|---|---|---|
| Hard | 0.5 | | Soft | 0.8 | | Hard | 0.7 |
| Soft | 0.3 | | Hard | 0.2 | | Soft | 0.6 |

FIG. 8

DEVICE, SYSTEM AND PROCESS FOR REDUNDANT PROCESSOR ERROR DETECTION

BACKGROUND

1. Field

The present disclosure relates generally to detection of errors in lockstep processing systems, and recovery from same.

2. Information

A lockstep computing system may comprise multiple fault-tolerant computer systems that execute the same set of operations in parallel. This redundancy may allow for reliable error detection and error correction. For example, an output from lockstep operations from different computing devices may be compared to determine whether a fault has occurred. To execute in lockstep, multiple computing devices may be configured to progress from one well-defined state to a subsequent well-defined state.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 7 is a schematic diagram illustrating a categorization of possible errors according to an embodiment;

FIG. 8 is a schematic diagram illustrating a categorization of possible errors according to an embodiment;

Figure 1:
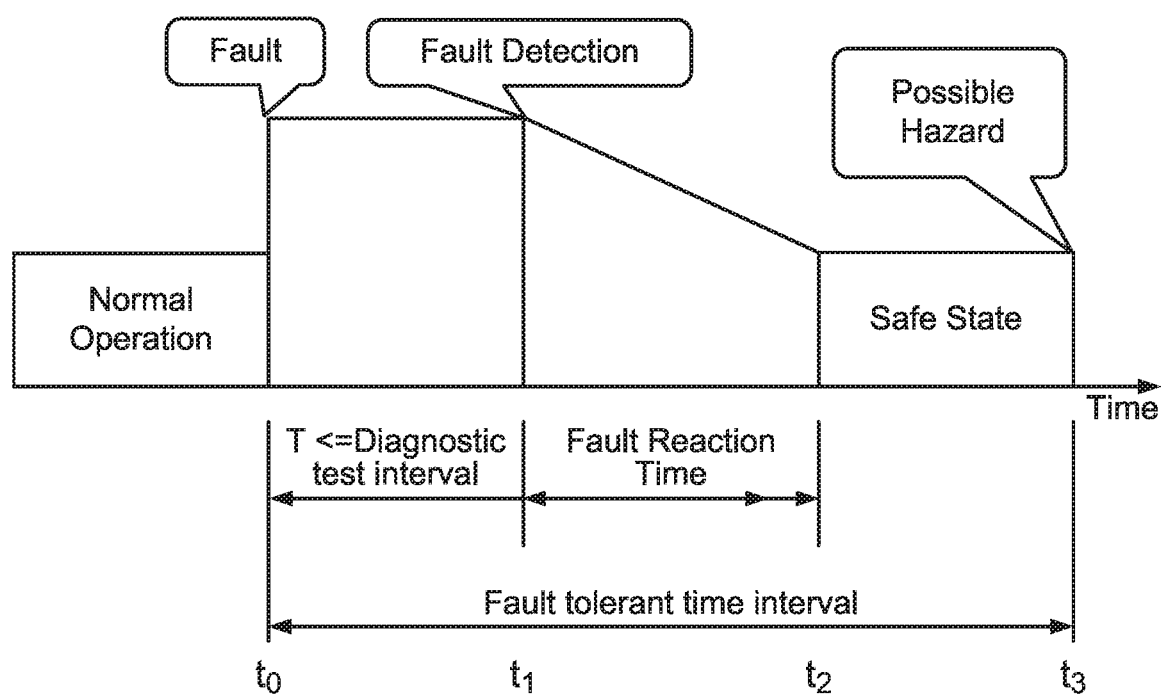
FIG. 1 is a timing diagram illustrated a sequence of events following an occurrence of a fault in a computing system according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, errors occurring in the execution of a lockstep processor system or device may be detected, at least in part, by a comparison of output signals observable at output ports of multiple processing cores or central processing units (CPUs) making up the lockstep processor system. In this context, a "processing core" or "CPU" as referred to herein means a single processing component (e.g., circuit) capable of executing instructions according to a set of executable computing instructions. Upon detection of an error, a lockstep processing system may determine whether the error is a "soft" soft error or a "hard error" using one of two methods. In this context, a "soft" error means a malfunction of a computing device arising from a transient condition such as, for example, a physical state or signal being altered in response to an ambient event (e.g., a radioactive particle altering a state of a device). A "hard" error means a malfunction of a computing device arising from a defective physical component such as a register or logic unit.

In detecting an erroneous condition, a lockstep processing system may initially presume that the erroneous condition originates from a soft error. In a dual-core lockstep (DCLS) system, for example, two processing cores may be reset and a real-time task is 1) restarted or 2) rolled back to a known reliable state where execution may be restarted in a so-called "reset followed by re-execution" procedure. If the erroneous condition repeats itself, such a "reset followed by re-execution" procedure may be repeated for up to a certain number of cycles. If the erroneous condition persists following the certain number of cycles, the source of the error may be deemed to originate from a hard error. If the error condition discontinues following "reset followed by re-execution", the error is classified as a soft error and execution continues.

In a lockstep processing system comprising three or more concurrently executing processing cores, an erroneous condition may be quickly isolated to a single processing core among the three or more currently executing processing cores since the erring processing core may be readily identified. Here, execution states of three or more processing cores executing in lockstep fashion may be compared and an outlying processing core having an execution state differing from execution states of the other processing cores may be determined to be the processing core having the source of an erroneous condition. In contrast to the aforementioned DCLS system embodiment, lockstep system having three or more concurrently executing processing cores may perform forward recovery rather backward recovery if an erroneous condition originates from a soft error. If the erroneous condition originates from a hard error (for example a stuck-at-fault in a register in load and store unit (LSU)), on the other hand, another failure may occur sometime in the future depending on whether the real-time task is to use the faulty unit again. A lockstep processing system may treat every error in this manner. However, if the same processing core in a lockstep system gives an error many times during the execution of the task, this may be an indication of a hard error in the processing core. In this scenario, a lockstep system may not perform forward recovery but instead classify the source of an erroneous condition as a hard error.

In an alternative implementation, a lockstep processing system may initially presume that an erroneous condition originates from a hard error. Presuming that an erroneous condition originates from a hard error, a lockstep processing system may employ a hardware or software-based built-in self-test (BIST) procedure to localize a fault (e.g., within a particular processing core). In one particular implementation, a BIST procedure may detect whether a particular erroneous condition indeed originates from a hard error. Here, a BIST procedure may detect stuck-at-faults in any of several testable units of a component. A BIST procedure may employ scan chains for detecting stuck-at-faults during run time or special software test libraries (STLs) written in the instruction sets of a native processor. Such STLs may generate functional test patterns to detect stuck-at-faults in the design by software. In a particular implementation, an STL can be created per unit within a particular processing core.

According to an embodiment, a BIST procedure may execute an exhaustive probing to locate a hard error (e.g., stuck-at faults) in processing cores. If a BIST procedure locates an error, the BIST procedure may classify the error as hard but if the BIST does not locate an error, the error may be classified as a soft error. In one implementation, once a BIST procedure classifies a particular erroneous condition as originating from a soft-error or a hard-error, a process of mitigating the erroneous condition may commence.

For example, if an error in a DCLS system is classified as hard, the DCLS system may shut down DCLS logic completely and execute operations to ensure that the system reaches a safe state not violating a fault tolerance requirement (e.g., FTTI (Fail Tolerant Time Interval) requirement as stated in ISO 26262 Automotive Functional Safety standard). In a particular example implementation, FTTI requirements may be set by manufacturers that test product components by inserting faults and statistically proving that FTTI is not violated. Improvements on FTTI may benefit a system by ensuring that the system will likely reach a safe state (which may become critical for future steer-by-wire deployments). In the case of a triple or more core lockstep system, a faulty processing core may be disabled, but the system may continue operation using the remaining processing cores at reduced safety level.

FIG. 1 is a timing diagram illustrating a sequence of events following an occurrence of a fault in a computing system according to an embodiment. As shown, a computing system, such as a lockstep computing system, may operate normally until a fault event occurs at time t0. Responsive to the fault event occurring at time $t_0$, a fault detector (such a lockstep comparator) may detect the fault at time $t_1$ and the fault detector characterize the fault through BIST to pinpoint a location of the fault and associate the fault with a particular type of fault (e.g., soft error or hard error). Processes may then initiate mitigating procedures to return the system to a safe state at time $t_2$. There is a desire to provide systems that reduce a time between an occurrence of a fault event (e.g., at time t0) and full recovery to a safe state (e.g., at time $t_2$ and in advance of a possible hazard at time $t_3$).

In some implementations, a BIST procedure may evaluate or probe testable units in a device in a set, predetermined sequence. For example, responsive to a detected fault event, a BIST procedure may sequentially probe testable units, one by one, in the predetermined sequence until a fault is localized to a particular testable unit in the device. Localizing and identifying possible or likely source of erroneous condition beforehand may enable an adaptation of a BIST procedure that enables a faster recovery time. In the particular example of FIG. 1, this may enable the fault reaction time between an detection of a fault at time $t_1$ and the beginning of safe state at time $t_2$.

Figure 2A:
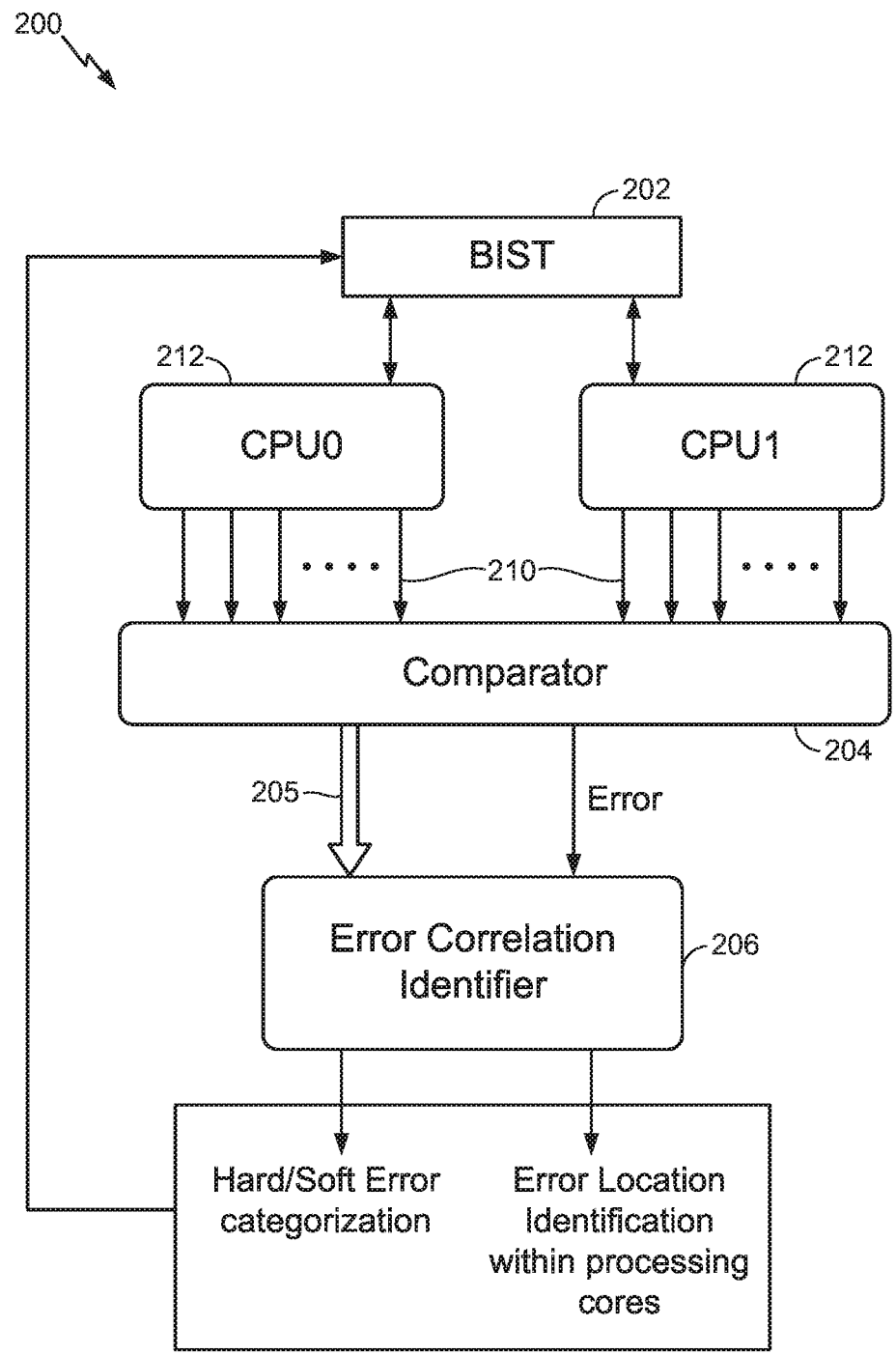
FIGS. 2A and 2B are schematic diagrams of lockstep processing systems according to an embodiment.
Figure 2B:
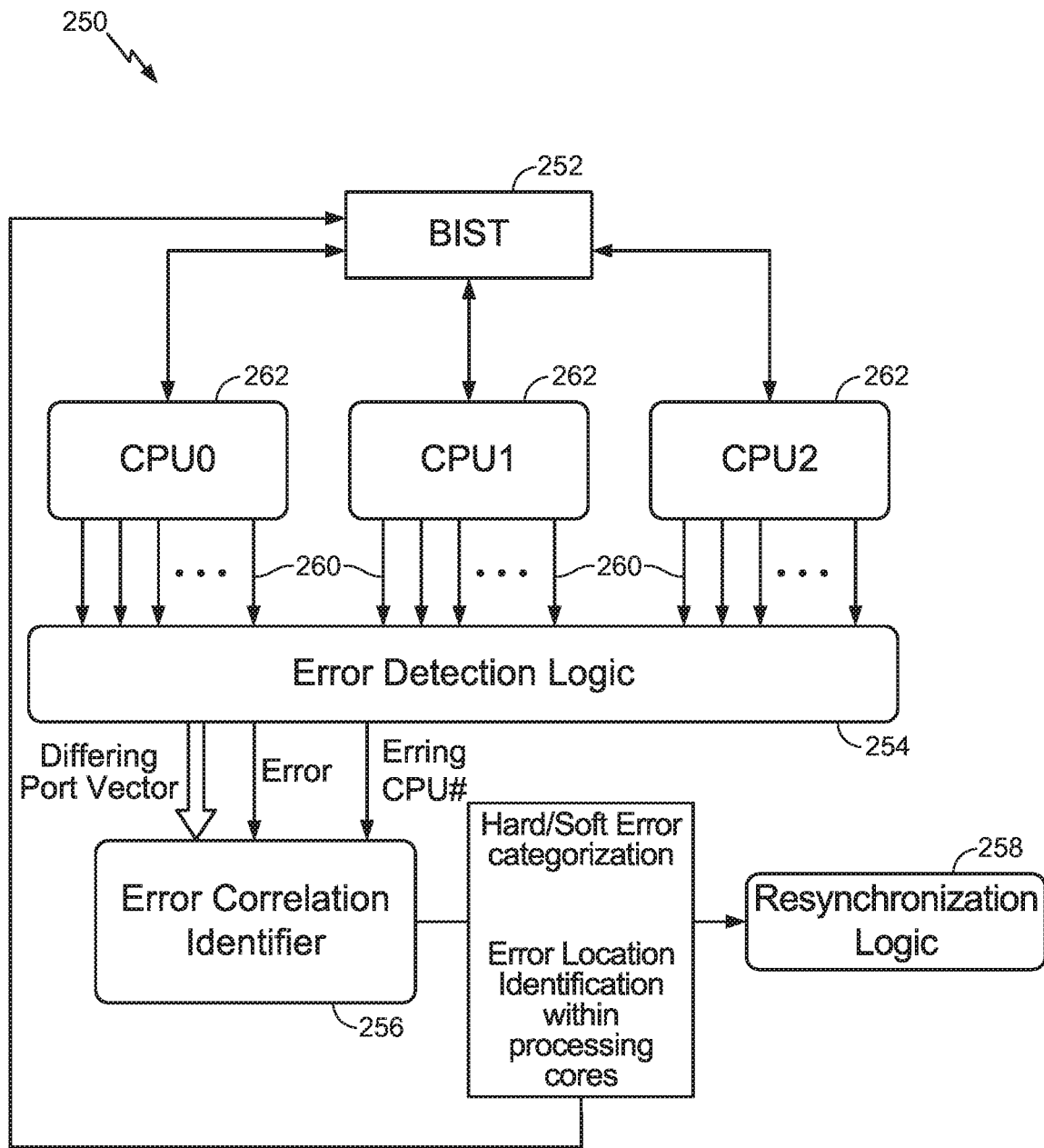

As shown in FIGS. 2A and 2B, according to a particular embodiment, lockstep computing device 200 comprises processing cores 212 (which may execute in a lockstep fashion) and lockstep computing device 250 comprises processing cores 262 (which may also execute in lockstep fashion). The particular embodiment of lockstep computing system 200 may be implemented a DCLS having two processing cores 212. The particular lockstep computing device 250 is shown as comprising three processing cores 252 for the purpose of illustrating a particular implementation. It should be understood, however, that lockstep computing device 250 may comprise four or more processing cores to execute in lockstep fashion without deviating from claimed subject matter. BIST units 202 and 252 may be configurable to execute a procedure to diagnose a source of an erroneous condition (e.g., identify a location or component of a processing core, determine a type of error as a hard error or soft error, etc.) detected in connection with execution of processing cores 212 or 262. BIST unit 202 or 262 may be implemented as hard transistor logic or as a programmable microcontroller, or completely in software as test libraries running on the processing cores or a combination thereof, and claimed subject matter is not limited to any particular such implementation of a BIST unit.

According to an embodiment, BIST system 202 may apply signals to terminals of processing cores 212 and observe signals provided in response to localize and characterize errors occurring in one or more processing cores 212. BIST system 252 may similarly apply signals to terminals of processing cores 262 and observe signals provided in response to localize and characterize errors occurring in one or more processing cores 262. According to an embodiment, BIST unit 202 or 252 may be adaptable responsive to observations of signals on output ports (e.g., output ports 210 or 260) to tailor or alter a BIST procedure for localizing and characterizing errors more quickly. In a particular implementation, rather than sequentially testing testable units of processing cores 212 or 262 according to a predetermined or random sequence, BIST unit 202 or 252 may adapt a sequence for testing testable units of processing cores 212 or 262 based on observations of signals on output ports (e.g., signals on output ports 210 or 260). For example, BIST unit 200 or 250 may probe testable units having a higher likelihood of being a source of the erroneous condition prior to probing testable units having a lower likelihood of being the source of the erroneous condition. As pointed out above, this may reduce a time from fault detection to fault recovery (e.g., reduce a time between $t_1$ to $t_2$ as shown in FIG. 1).

According to an embodiment, output ports 210 of processing cores 212 may comprise terminals from which signals may be observed while processing cores 212 execute in lockstep fashion. Similarly, output ports 260 of processing cores 262 may comprise terminals from which signals may be observed while processing cores 262 execute in lockstep fashion. For example, signals observable at output ports 210 or 262 may comprise any one of several type of digital signals. In a particular implementation, error detection logic 204 or 254 may comprise components capable of obtaining observations of signals at output ports by, for example, obtaining copies of particular digital states. Error detection logic 204 or 254 may also comprise logic capable of detecting a presence of a fault in connection with lockstep execution of processing cores 212 or 262. Error detection logic 204 or 254 may generate an error signal "Error" (e.g., to error correlation identifier 206 or 256). Error detection 254 may, in addition to detecting a presence of a fault in connection with lockstep execution of processing cores 262, isolate the fault to a particular processing core of multiple processing cores 262. Here, may generate a signal "Erring CPU #" to error correlation identifier 256 indicating the particular processing core 262 having the detected fault.

According to an embodiment, particular observable signals provided by an output port 210 or 260 may comprise, for example, memory or device addresses, data bits, computed values, control bits/signals, just to provide a few examples. In one particular implementation, error detection logic 204 or 254 may obtain discrete observations of signals provided on output ports 210 or 260 at particular observation or sample times (e.g., on periods according to a clock signal).

Figure 3:
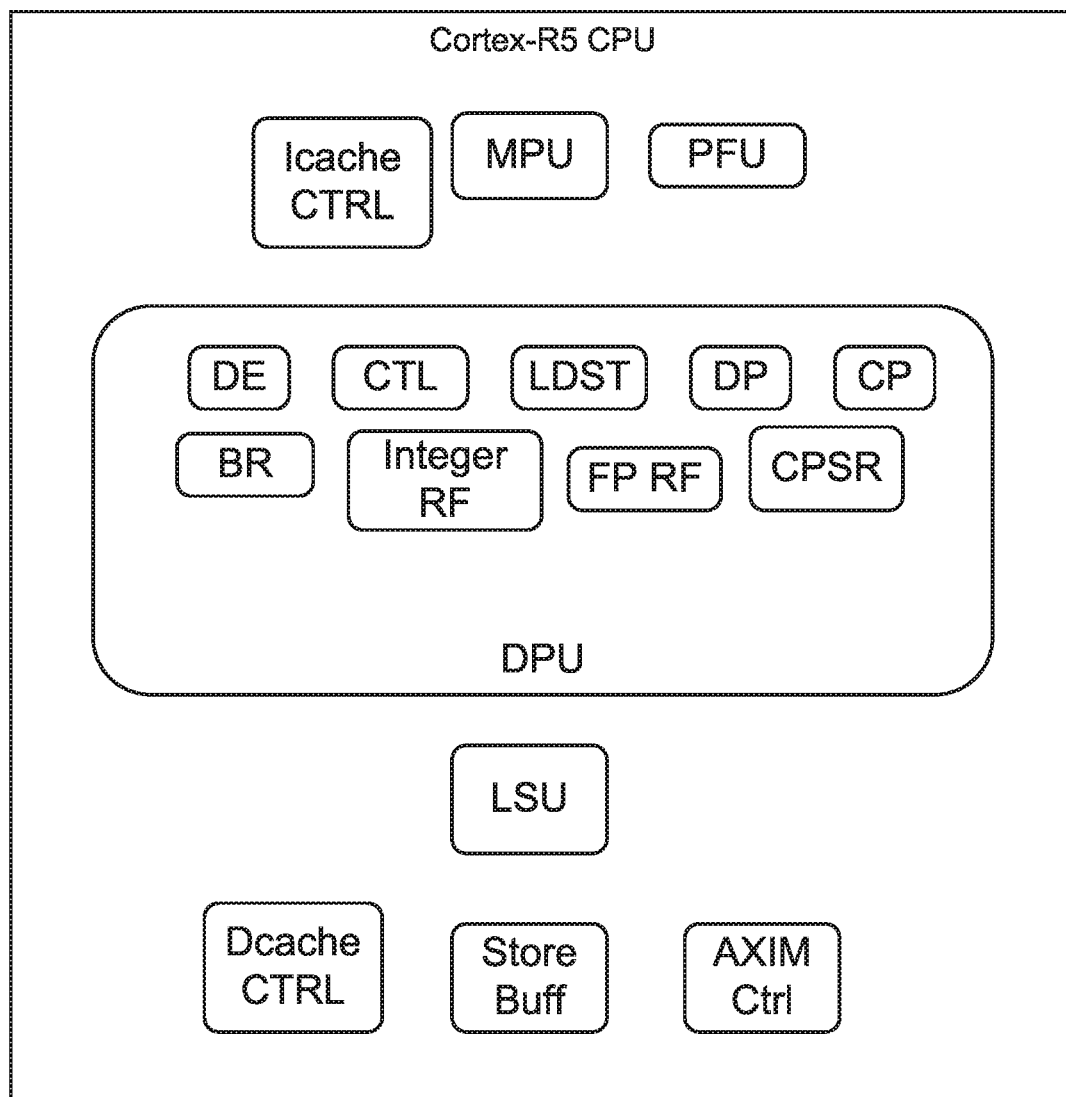
FIG. 3 is a schematic diagram of central processing unit (CPU) or processing core of a multi-core computing system according to an embodiment.

As pointed out above, a multi-processor computing system may be composed of multiple testable units. In this context, a "testable unit" as referred to herein means an identifiable portion or aspect of a processing system that may fail or malfunction in a manner affecting execution of the processing system. In a particular implementation, a testable unit may comprise an identifiable portion of a processing core (such as a processing core among multiple processing cores in a lockstep processing device). A testable unit may be probed/tested as part of a BIST procedure. FIG. 3 is a schematic diagram of a single processing core 300 of a multi-processor computing system according to an embodiment. Features of CPU 300 may be present in one or more of processing cores 212 shown in FIG. 2A or processing cores 262 shown in FIG. 2B. As shown, processing core 300 may be partitioned into multiple testable units such as a load and store unit (LSU), storage buffer (Store Buf), cache controller (Icache Ctrl), memory interface controller (AXIM Ctrl), write buffer controller (Dcache Ctrl), data processing unit (DPU), memory protection unit (MPU) and pre-fetch unit (PFU). As shown, a data processing unit may comprise additional testable units such as decoder (DE), control logic (CTL), load store controller (LDST), data processing (DP), control processing (CP), branch (BR), integer register file (integer RF), floating point register file (FPRF) and control program status register (CPSR). It should be understood, however, that these are merely examples of testable units that may be defined for a processing core device, and that claimed subject matter is not limited in this respect. According to an embodiment, a testable unit may be probed in the execution of a BIST procedure by, for example, application of one or more probe or test signals to the testable unit and evaluating one or more signals generated in response to application of the one or more probe or test signals. Alternatively, a testable unit of a processing core may be probed by software executing on the processing core for detecting stuck-at faults. Software BIST or SBIST may also comprise an online error detection technique that uses special software test libraries (STLs) written in particular instruction sets of a native processor architecture to generate functional test patterns, test the processing core and detect stuck-at-faults in the design by software. In a particular implementation, an STL may be created per unit within a processing core. One advantage of SBIST is that SBIST may enable a relatively low-cost solution as it does not require extra hardware to detect hard faults.

Figure 4:
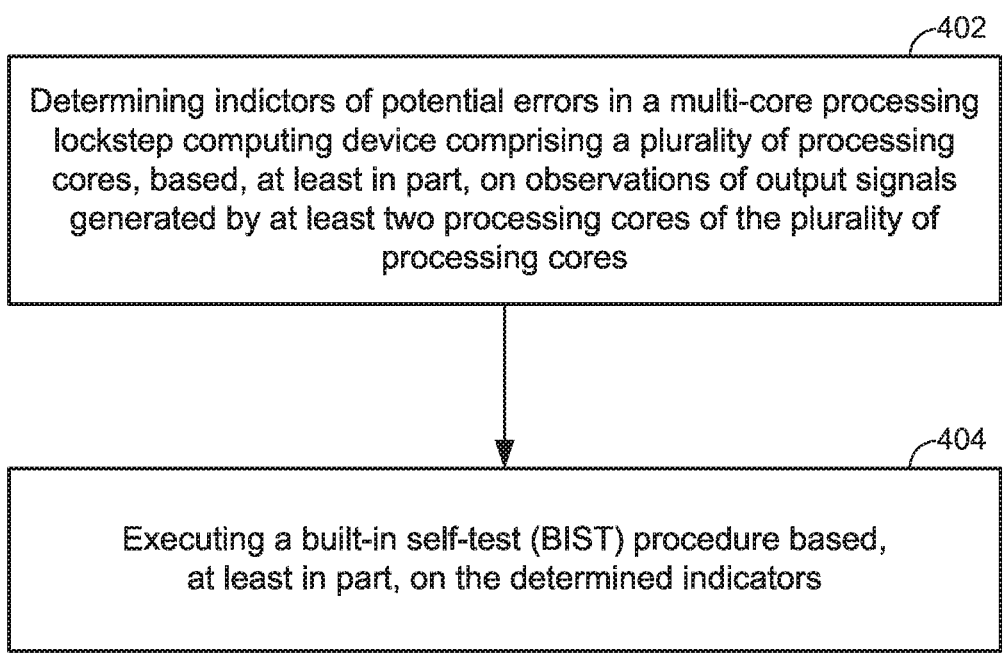
FIG. 4 is a flow diagram of a process for characterizing errors in a multi-core lockstep processing system according to an embodiment.

FIG. 4 is a flow diagram of a process for characterizing errors in a multi-processing core lockstep processing system according to an embodiment. In this context, as referred to herein, a "multi-processing core lockstep processing system" means a device comprising multiple processing cores that execute the same set of operations, on the same data and initial states, at the same time in parallel. Observed output signals of the multiple processing cores may be compared to determine whether a fault has occurred at one of the processing cores. Also, output signals of the multiple processing cores may be compared to determine a location of such a fault within a multi-processing core lockstep processing system and/or characterize the fault as originating from a hard error or a soft error.

As discussed above, while error detection logic 204 in lockstep computing system 200 may detect a presence of an erroneous condition, error detection logic 204 may not be capable of isolating the detected fault to a single processing core of the two processing cores 212. Here, block 402 may evaluate testable units in both processing cores 212 to determine a likely source (or sources) of an erroneous condition. Error detection logic 254 in lockstep computing device 250, on the other hand, may localize a source of a particular error to a single processing core of multiple processing cores 262 (e.g., indicated by signal "Erring CPU #") by, for example, determining that the single processing core has an execution state that differs from identical execution states of the two other processing cores.

According to an embodiment, actions at blocks 402 and 404 may be performed, at least in part, by lockstep computing device 200 or 250 (e.g., at error correlation identifier 206 or 256). In a particular implementation, blocks 402 and 404 may be executed by transistor logic or by instructions on the processing cores, or some combination thereof. Block 402 may comprise determining indicators of potential errors in a multi-processing core lock step computing device such as lockstep computing system 200 or 250. For example, such indicators may be determined based, at least in part, on observations of output signals on output ports 210 obtained by error detection logic 204 or output signals on output ports 260 obtained by error detection logic 254. In one particular implementation, indicators of potential errors in a multi-processing core lockstep processing system may comprise likelihood scores associated with aspects or features of the multi-processing core lockstep processing system having a fault that is a source of an erroneous condition. For example, such indicators may comprise values indicative of likelihoods that particular testable units of the multi-processing core lockstep processing system (e.g., particular testable units shown in FIG. 3) are a source of a detected erroneous condition (e.g., an erroneous condition detected by error detection logic 204 or 254). Such indicators may also indicate a likelihood that a detected error condition originates from a soft or hard error event.

A "BIST procedure" as referred to herein means a procedure performed by an entity within a device or system to test components (e.g., hardware or software elements of a computing system) of the device or system to identify faults or potential faults. Based, at least in part, on indicators of potential errors determined at block 402, block 404 may execute a BIST procedure. For example, BIST unit 202 embedded in lockstep computing system 200 or BIST unit 252 embedded in lockstep computing system 250 may perform a BIST procedure to localize and/or characterize sources of erroneous conditions such as testable units of processing cores 212 or 262. In an alternative implementation, lieu of an embedded BIST unit, each processing unit may execute modules of a software test library in a particular order. Such a particular order for executing the modules of the software test library may be determined based, at least in part, on the indicators of potential errors determined at block 402. As indicated above, indicators of potential errors may comprise expressions of likelihood that particular testable units are a source of a detected erroneous condition. In one implementation, block 404 may determine an order that testable units of a lockstep computing system are to be probed or tested in a BIST procedure. For example, testable units having a higher likelihood of being a source of a detected erroneous condition may be probed or tested by a BIST procedure before testable units having a lower likelihood of being the source of the detected erroneous condition. Also, indicators determined at block 402 may also indicate whether a particular source of a detected erroneous condition is likely a hard error or a soft error.

In a particular implementation, block 402 may associate observations of output signals generated by multiple processing cores into signal categories. According to an embodiment, observations of output signals a signal category may comprise bits for a particular data item, address control signal and/or the like at a particular time (e.g., at a common clock state). For example, observations of output signals in one signal category may comprise 32 bits of a 32-bit memory address at a common clock state. Observations of output signals in another signal category may comprise 64 bits of a 64-bit data word at a common clock state. Observations of output signals in another signal category may comprise multiple bits of a control signal at a common clock state.

In a particular implementation, block 402 may compare observations of output signals of the same signal category and common clock state obtained from different processing cores in a multi-processing core lockstep processing system to identify a divergence. For example, block 402 may compare observations a particular 64-bit data item from multiple processing cores bit by bit at a particular clock state to determine any divergence of a bit value in the 64-bit data item from one processing core from a corresponding bit value in the 64-bit data item from a second processing core. Such a divergence may be indicative of a soft or hard error at a particular testable unit of either the first or second processing core.

In a particular implementation, block 402 may determine indicators of particular errors as scores associated with particular testable units of one or more processing cores. For example, for one or more testable units of a multiple processing core lockstep processing system, block 402 may determine a score indicative of a likelihood that the testable unit is a source of an erroneous condition. Block 402 may further determine a likelihood that, if a particular testable unit is the source of the erroneous condition, the source of error is a hard error or a soft error.

Figure 5:
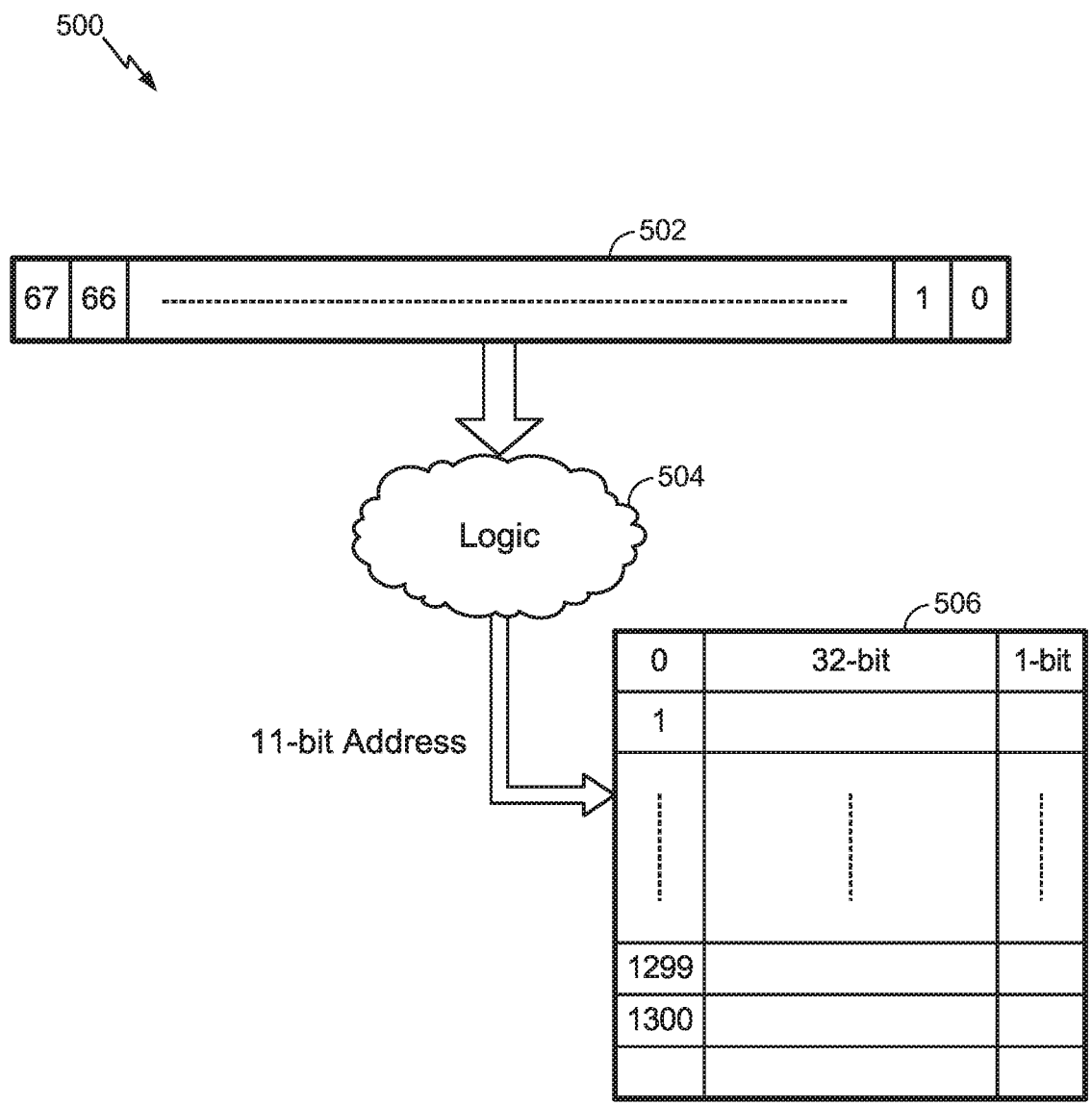
FIGS. 5 and 6 are schematic diagrams illustrating an implementation of an example computing environment for determining indictors of potential errors in a multi-core lockstep computing system according to an embodiment.
Figure 6:
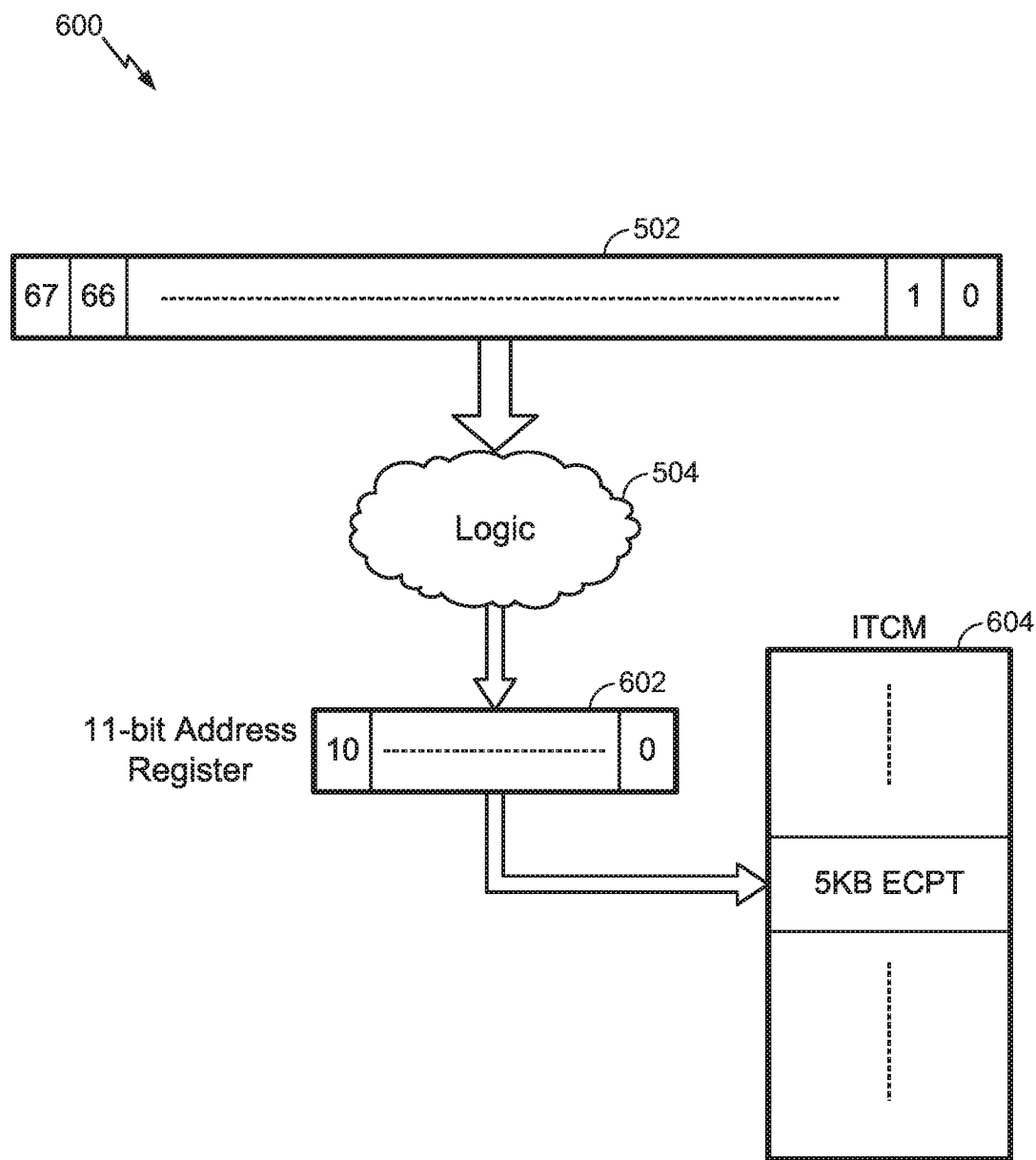

Block 402 may compute indicators of potential errors in a multi-processing core lockstep computing device using any one of several processing techniques and/or computing structure. FIGS. 5 and 6 is a schematic diagram illustrating an implementation of an example computing environment associated with determining indicators of potential errors in a multi-processing core lockstep computing device. In the particular implementation of finite bit register 502, signals observable at output ports 210 may map to 68 different signal categories, each category being represented in a bit position of finite bit register 502. According to the embodiment of FIG. 5, a bit position in finite bit register 502 may indicate a divergence of output signals of a signal category corresponding with the bit position on a particular clock state observed at output ports of different processing cores in the multi-processing core lockstep computing device. For example, if a signal category includes a 64-bit data item and at least one bit in the data item observed at a particular clock state from an output port of one processing core differs from a corresponding bit in the data item observed at a particular clock state from an output port of a second processing core, a value of "1" may be placed in a bit position of finite bit register 502 to indicate a divergence.

Logic 504 may comprise a structure, such as digital transistor logic or a microcontroller executing instructions, to process values in the 68 bit locations of finite bit register 502 for determining an address such as an 11-bit address. In the particular illustrated example, an address generated by logic 504 may map to any one of multiple rows of table 506 associated with particular "combined signal categories." While the particular implementation of FIG. 5 shows that the address generated by logic 504 may map to one of 1300 rows (or associated combined signal categories), it should be understood that this address may map to a smaller or greater number of rows without deviating from claimed subject matter. In this context, a particular combined signal category (of multiple combined signal categories) may be indicative of a particular condition at a core processing unit. For example, a particular combined signal category may be indicative of a particular condition at a core processing unit determined based, at least in part, on a combination of values in the 68 bit locations of finite bit register 502.

Contents of an individual row of table 506 (e.g., associated with a unique address generated by logic 504) may be based, at least in part, on indicators of potential errors in a multi-processing core lockstep computing device determined at block 402. In a particular implementation, a row in table 506 may comprise values associated with particular testable units indicative of likelihoods that the particular testable units are a source of a detected erroneous condition for a particular combined signal category associated with the row. Alternatively, a row in table 506 may comprise an ordering of symbols based on likelihoods that particular testable units are a source of a detected erroneous condition. For example, for each of multiple testable units of a processing core suspected as having an erroneous condition, a 32-bit portion of a row in table 506 may associate a value indicative of a likelihood that the testable unit is the source of the erroneous condition.

A single bit portion of a row in table 506 may indicate a likely categorization of a detected error as being a soft or hard error. Based, at least in part, on contents of a row of table 506 addressable by an address generated by logic 504, a BIST procedure may be executed. For example, contents of the 32-bit portion of such a row in table 506 may be used to determine a priority or rank order of testable units to be probed in the BIST procedure. Contents of a one bit portion of such a row in table may be used by the BIST procedure to prioritize probing for soft errors or hard errors. Here, based on contents of a row in table 506 a BIST unit may determine an order that testable unites are to be probed in a BIST procedure.

According to an embodiment, contents of table 506 may be stored in a memory based on values determined prior to runtime execution of the multi-processing core lockstep computing device. For example, contents of rows of table 506 may be determined using off-line computation and/or statistical analysis. In other implementations, contents of rows of table 506 may be determined and/or updated based on statistical observations in real-time. FIG. 6 is a schematic diagram of an alternative implementation in which table 506 is maintained in an instruction scratchpad memory that is accessed by an exception handler executing lockstep on the processing cores, based on an address value determined by logic 504 and loaded to a register 602. Here, instruction scratchpad memory 604 may determine indicators of potential errors (e.g., such as indicators for determining contents of a selected row of table 506 described above) for use by a BIST procedure as discussed above.

FIG. 7 is a schematic diagram illustrating numerical indicators that may be used to determine contents of rows of a table such as 32-bit portions of rows in table 506 described above. Here, multiple records 700 may correspond to contents of 32-bit portions of rows in table 506 wherein each record 700 may correspond to a combined signal category and represent indicators for a corresponding row in table 506 associated with the combined signal category. In one implementation, numerical values determined for a particular record 700 may determine an ordering of symbols (e.g., symbols representing testable units) in a corresponding row of table 506. Such an ordering of symbols may indicate an ordering in which corresponding testable are to be probed by a BIST procedure. For example, record 7001 may correspond with a first row of table 506 (and corresponding first combined signal category) and record 700n may correspond with an nth row of table 506 (and corresponding nth combined signal category). As shown, a record 700 identifies particular testable units and may associate each identified testable unit with a numerical likelihood score. This numerical likelihood score may determine a rank of the identified testable unit relative to other testable units, and determine placement of an associated symbol among symbols in a corresponding row of table 506. Based on an ordering of symbols in the corresponding row of table 506, for example, a BIST procedure may be configured to probe testable units associated with higher likelihood scores before probing testable units associated with lower likelihood scores.

FIG. 8 is a schematic diagram illustrating numerical indicators representing whether a source of an erroneous condition is more likely to be a hard error or a soft error. For example, each record 800 may indicate or relate to contents of single bit portions of rows of table 506 indicating whether an erroneous condition of a particular combined signal category is more likely to be a hard error or a soft error. A record 800 may have likelihood scores where a higher likelihood score associated with a particular error type indicates that the particular error type is more likely. In an implementation, record 8001 may correspond with a single bit portion of a first row of table 506 and record 800n may correspond with a single bit portion of an nth row of table 506. In one embodiment, likelihood values for a particular combined signal category of a record 800 may represent likelihoods that independent of likelihood values of associated with particular testable units in a corresponding record 700 for the particular combined signal category. In an alternative implementation, likelihood values for a particular combined signal category of a record 800 may represent likelihoods that depend on likelihood values of associated with particular testable units in a corresponding record 700 for the particular combined signal category.

According to an embodiment, values shown in records 700 and 800 in FIGS. 7 and 8 may be determined based, at least in part, on a statistical analysis of observations of divergences of signals observed on output ports of different processing cores of a multi-processing core lockstep processing device under various known error conditions. For example, soft or hard errors may be injected at particular testable units of a processing core of a multi-processing core lockstep processing device while divergences among signal categories are observed. A fault injection framework may inject numerous (e.g., millions) of soft and hard errors in logic elements inside a processing core in a DCLS system. Data may be collected and then later analyzed while multiple processing cores are running benchmarks in lockstep.

Figure 9A:
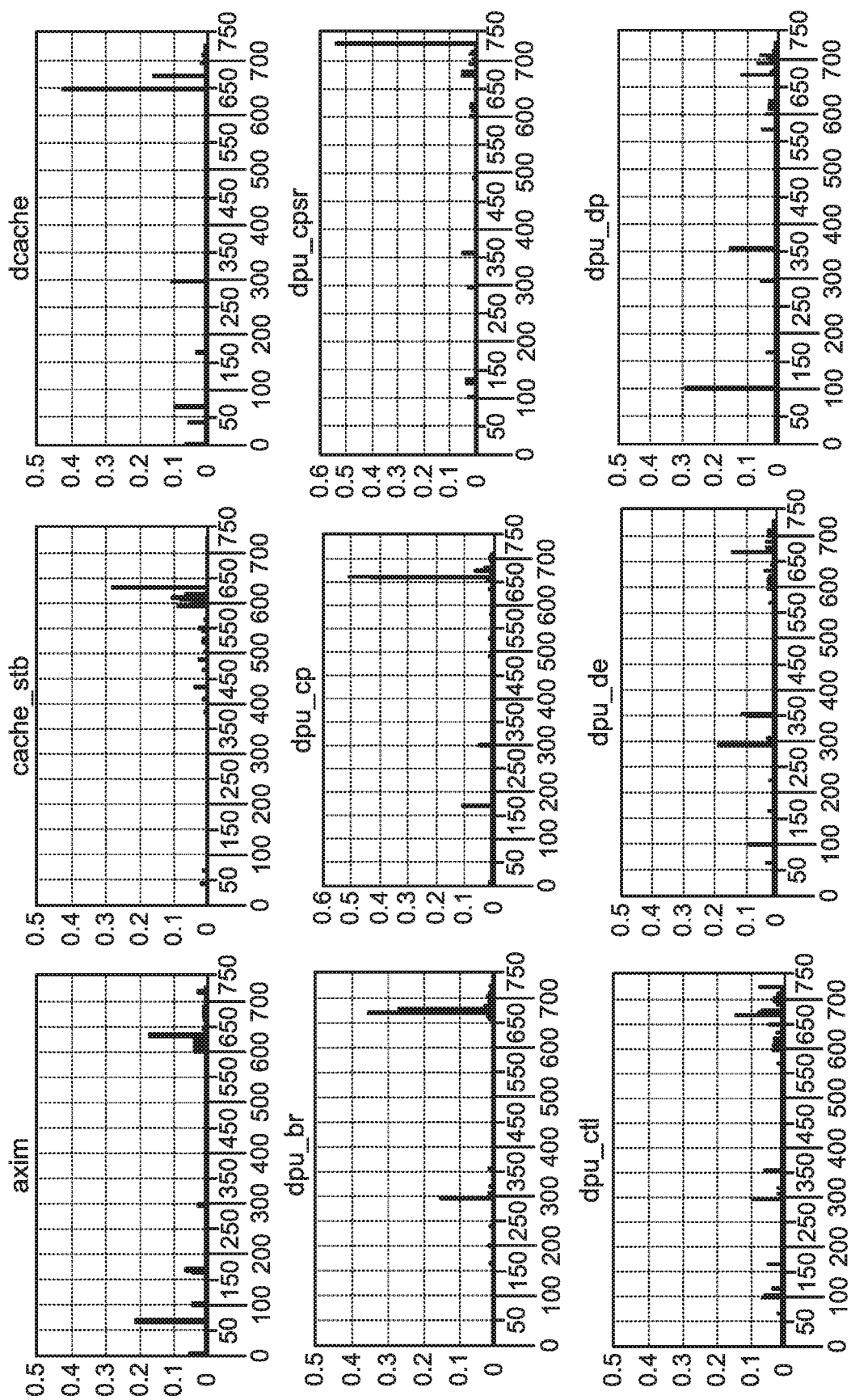
FIGS. 9A and 9B show histograms plotting occurrences of soft errors for originating at particular testable units of a multi-core lockstep processing system according to an embodiment.
Figure 9B:
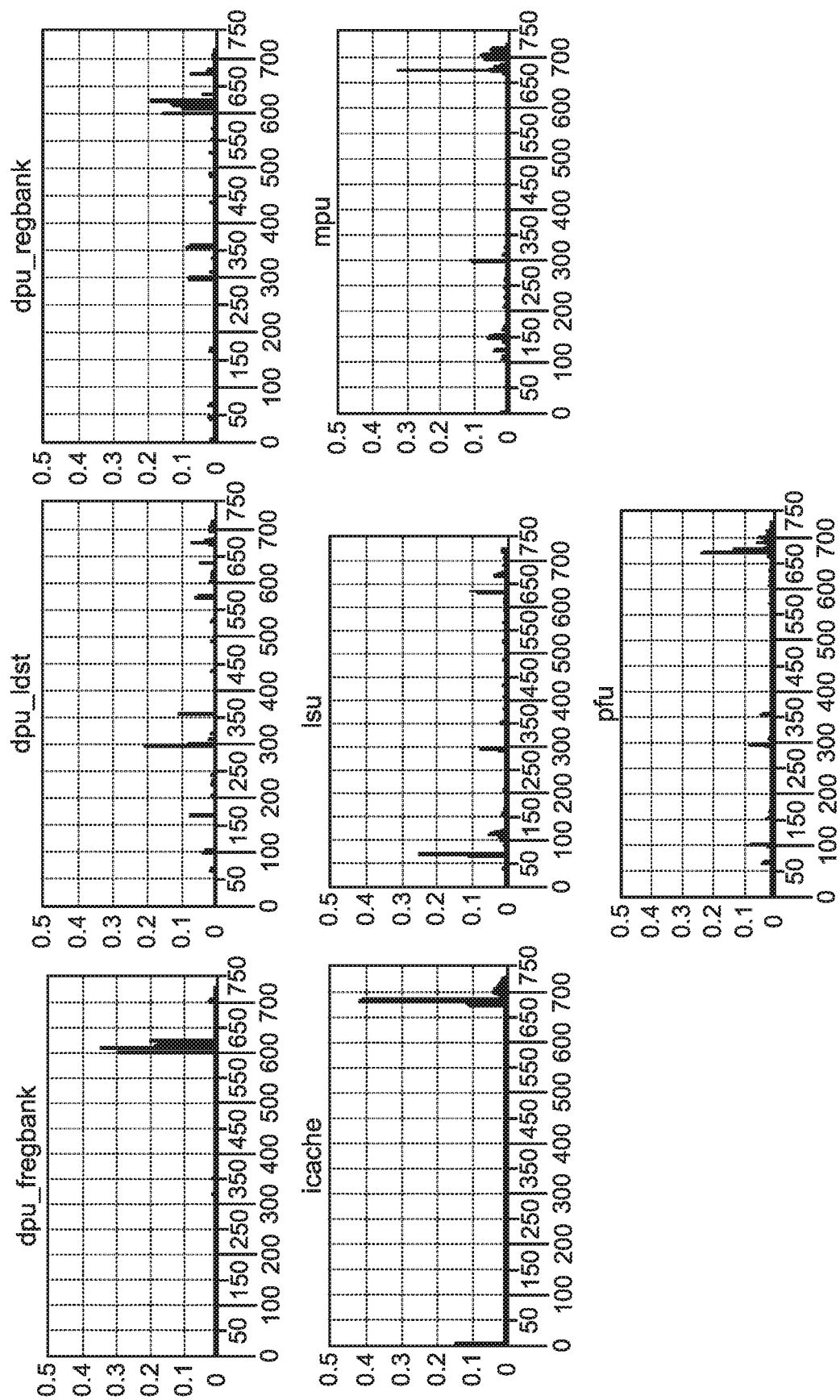
Figure 10A:
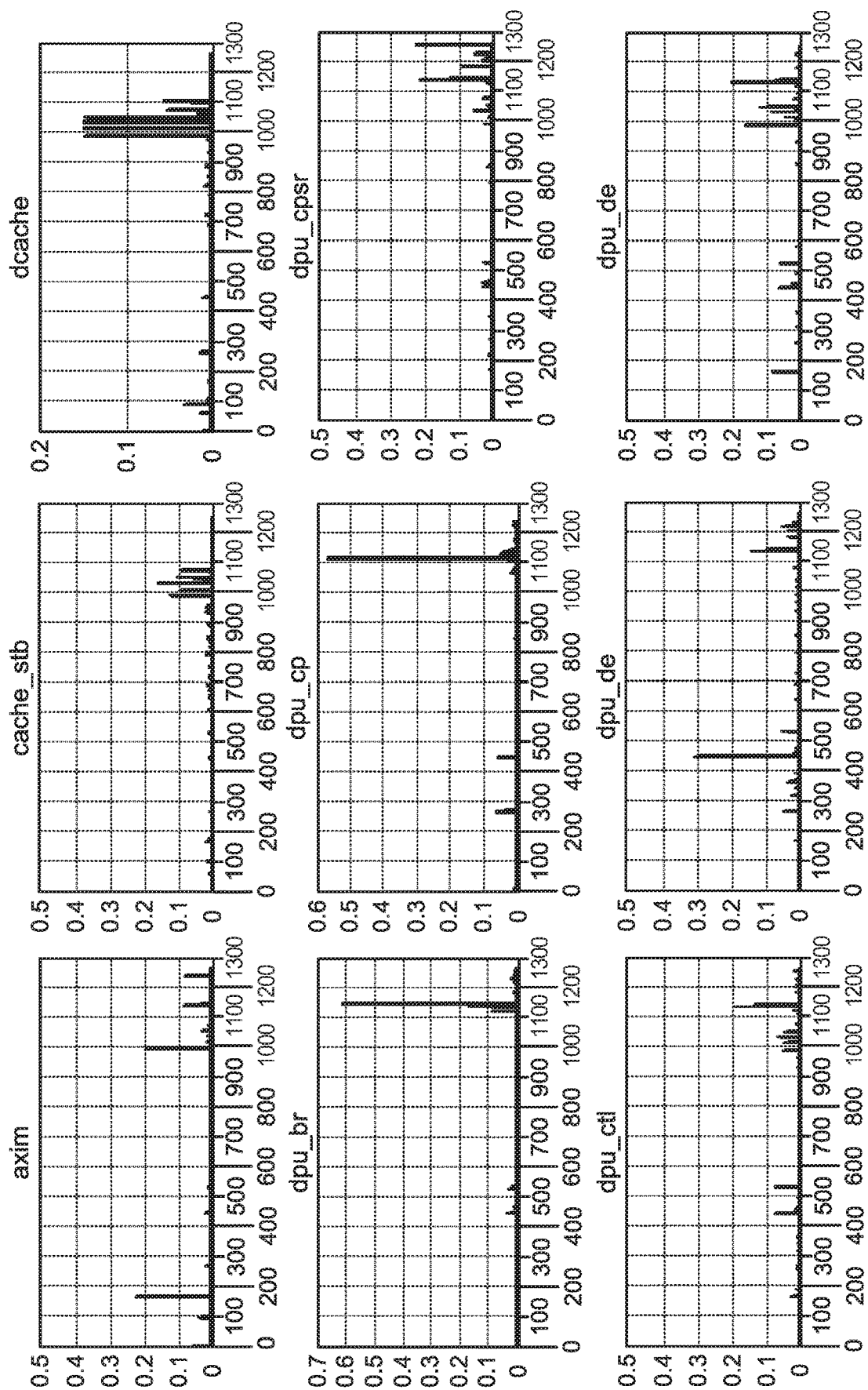
FIGS. 10A and 10B show histograms plotting occurrences of hard errors originating at particular testable units of a multi-core lockstep processing system according to an embodiment.
Figure 10B:
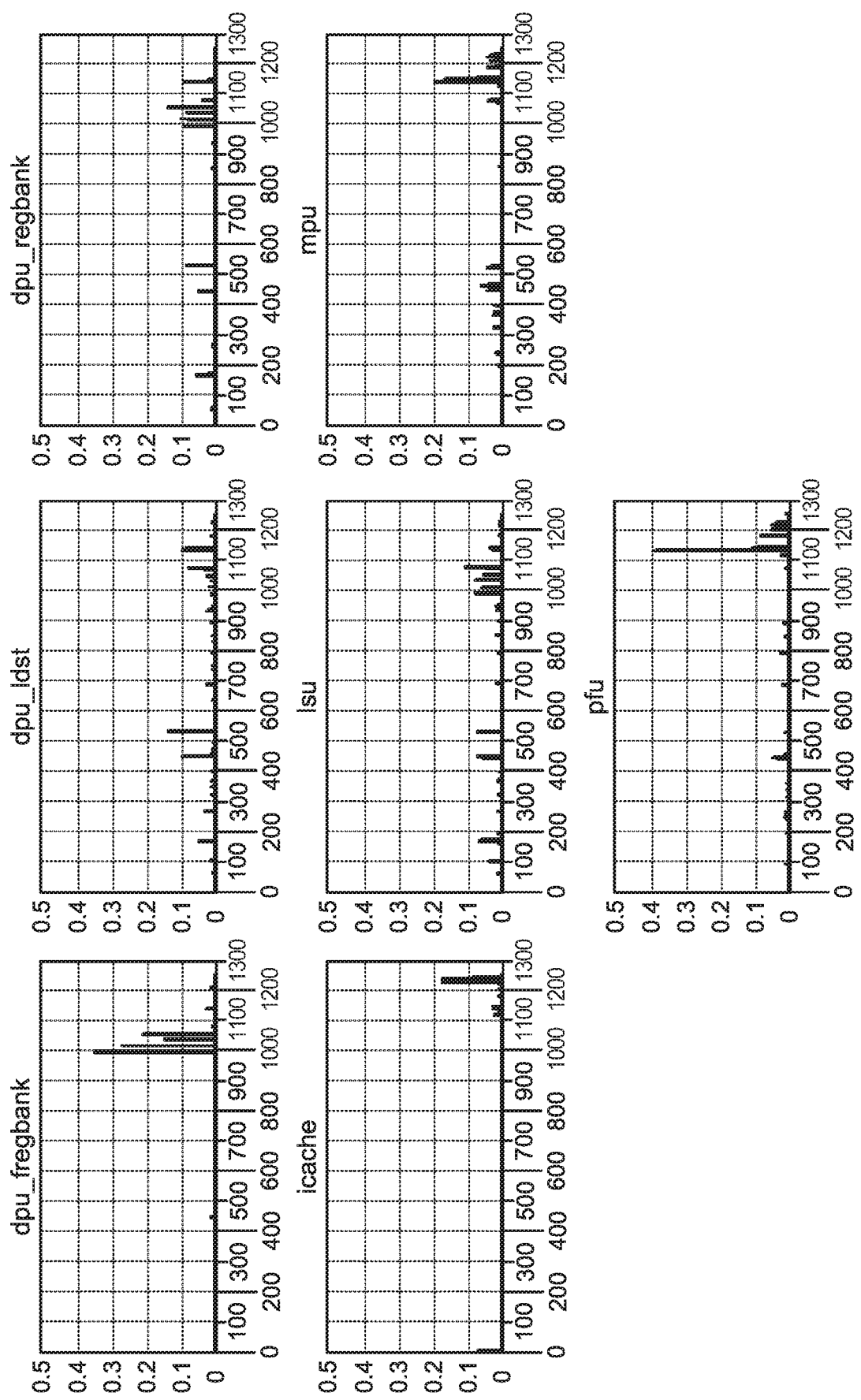

FIGS. 9A and 9B show histograms for testable units mapping occurrences of particular combined signal category errors for soft errors at particular testable units. Here, each histogram is associated with a particular testable unit and evaluates incidents of soft errors for 750 different combined signal categories. Similarly, FIGS. 10A and 10B show histograms for testable units mapping occurrences of particular combined signal category errors for hard errors at particular testable units. For example, each histogram is associated with a particular testable unit and evaluates incidents of hard errors for 1300 different combined signal categories.

Each histogram shown in FIG. 10 for a particular testable unit shows a frequency of hard errors originating at testable unit for each of 1300 combined signal categories. In one implementation, likelihood scores for a record 700 in FIG. 7 associated with a particular combined signal category may be determined based on histogram values at the particular combined signal category for multiple testable units. For example, in a combined signal category Category1, a DPU is associated with a score 0.9, an AXIM is associated with a score of 0.5 and an LSU is associated with a score of 0.3. In another example, for a particular signal category, say combined signal category 1000 of the 1300 combined signal categories, histogram values at combined signal category of x-axes of multiple histograms may be used to determine likelihood scores for a record 700 associated with combined signal category 1000. In one example, these likelihood scores in the record 700 may be computed based on a normalization of histogram values. For example, for a particular likelihood score to be associated with a particular testable unit for combined signal category 1000, a histogram value from the histogram for the particular testable unit may be normalized with respect to histogram values for combined signal category 1000 for other testable units.

Figure 11A:
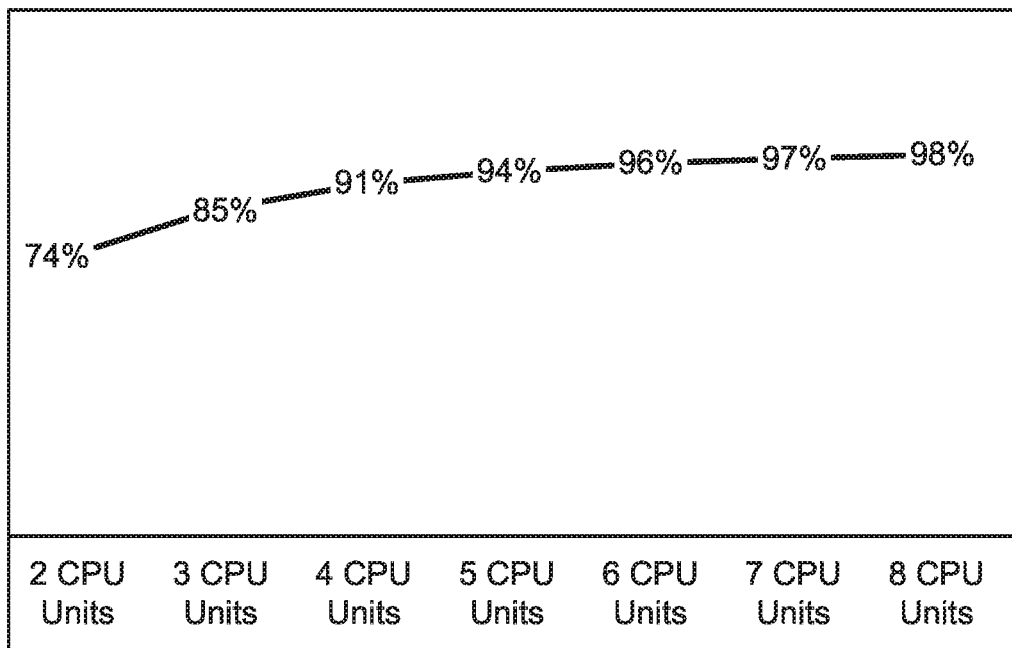
FIGS. 11A and 11B are plots of probabilities of accurate identification of hard and soft errors as sources of erroneous conditions according to an embodiment.
Figure 11B:
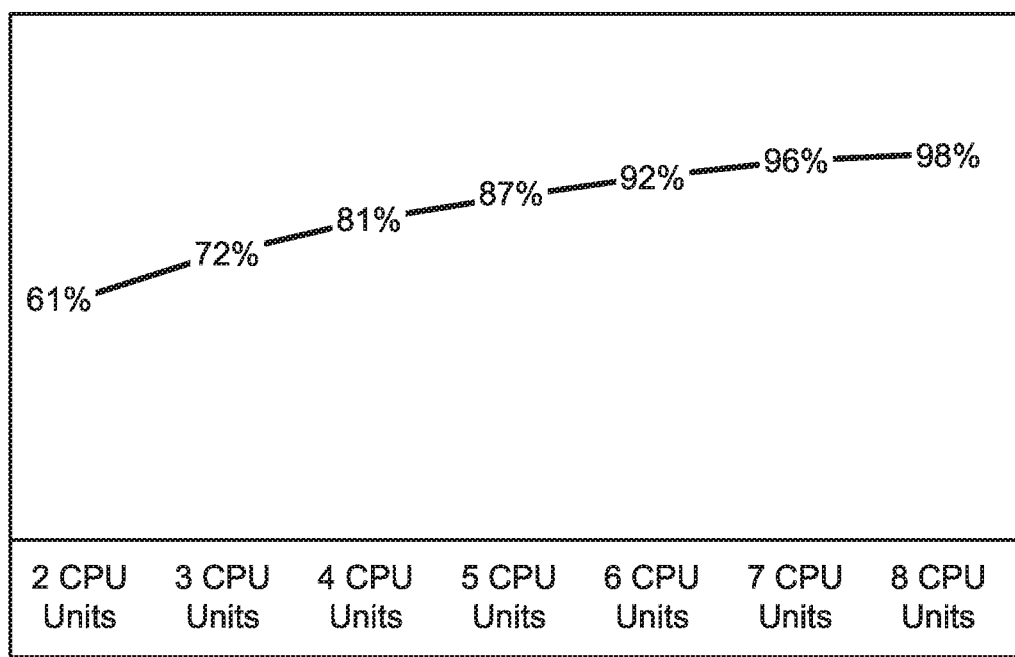

FIGS. 11A and 11B are plots illustrating accuracy of identification of hard and soft errors as being source of an erroneous condition in a multi-processing core lockstep processing device according to a particular implementation. FIG. 11A, for example, shows a percentage of accurate identification of a soft error as being a source of an erroneous condition in a multi-processing core lockstep processing device using techniques described herein as a function of a number of processing cores in the multi-processing core lockstep processing device. Similarly, FIG. 11B shows a percentage of accurate identification of a hard error as being a source of an erroneous condition in a multi-processing core lockstep processing device using techniques described herein as a function of a number of processing cores in the multi-processing core lockstep processing device.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

In particular implementations, components shown in FIGS. 2A and 2B may comprise one or more circuits, such as digital circuits, to perform at least a portion of a computing procedure and/or process. By way of example, but not limitation, multi-CPU lockstep computing devices 200 and 250 may comprise one or more processors, such as controllers, microprocessors, microcontrollers, application specific integrated circuits, digital signal processors, programmable logic devices, field programmable gate arrays, the like, or any combination thereof. In various implementations and/or embodiments, components in multi-CPU lockstep computing devices 200 and 250 may perform signal processing, typically substantially in accordance with fetched executable computer instructions, such as to manipulate signals and/or states, to construct signals and/or states, etc., with signals and/or states generated in such a manner to be communicated and/or stored in memory, for example.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
    determining one or more indicators of one or more potential errors in a multi-core lockstep computing device comprising a plurality of processing cores based, at least in part, on observations of output signals generated by at least two processing cores of the plurality of processing cores, wherein the one or more indicators indicate at least locations of the one or more potential errors in the at least two processing cores, and one or more likelihood scores associated with locations of the potential errors; and
    executing a built-in self-test (BIST) procedure based, at least in part, on the determined one or more indicators.

2. The method of claim 1, wherein the one or more indicators further indicate types of errors as soft errors or hard errors.

3. The method of claim 1, wherein the multi-core lockstep computing device is segmented into testable units, and wherein executing the BIST procedure further comprises determining an order of probing the testable units based, at least in part, on the one or more indicators.

4. The method of claim 3, wherein the testable units are defined, at least in part, by a physical location or logical function, or a combination thereof.

5. The method of claim 1, wherein the multi-core lockstep computing device comprises a plurality of testable units, and wherein determining the one or more indicators of the one or more potential errors further comprises:
    for at least one of the at least two processing cores, associating observations of output signals generated by the at least one processing core with two or more signal categories;

in at least one of the two or more signal categories, determining divergences of observations of output signals between or among the two or more processing cores; and determining one or more likelihood scores for at least two of the plurality of testable units based, at least in part, on the determined divergences of observations of output signals between or among the two or more processing cores.

6. The method of claim 5, wherein the executing the BIST procedure further comprises:

determining an order of probing the plurality of testable units based, at least in part, on the determined one or more likelihood scores.

7. The method of claim 1, wherein the observations of output signals comprise multiple data bits, address bits or control bits, or a combination thereof.

8. A device comprising:

a plurality of processing cores to execute as a multi-core lockstep computing device; and a built-in self-test (BIST) unit to execute a BIST procedure based, at least in part, on one or more indicators of one or more potential errors in the multi-core lockstep computing device, the one or more indicators of the one or more potential errors to be based, at least in part on observations of output signals generated by at least two of the plurality of processing cores, wherein the multi-core lockstep computing device to be segmented into testable units, and wherein execution of the built-in self-test procedure further to comprise determination of an order to probe the testable units based, at least in part, on the one or more indicators.

9. The device of claim 8, wherein the one or more indicators to indicate at least locations of the potential errors in the at least two processing cores, and one or more likelihood scores associated with the locations of the potential errors.

10. The device of claim 9, wherein the one or more indicators further to indicate types of errors as soft errors or hard errors.

11. The device of claim 8, wherein the testable units to be defined, at least in part, by physical locations or logical functions, or a combination thereof.

12. The device of claim 8, wherein the one or more indicators of the one or more potential errors to be determined based, at least in part, on divergences of observations of output signals between or among the two or more processing cores.

13. The device of claim 8, wherein the one or more indicators to comprise one or more likelihood scores associated with the testable units, and wherein execution of the BIST procedure further to comprise determination of the order of to probe the plurality of testable units based, at least in part, on the one or more likelihood scores.

14. The device of claim 8, wherein the observations of output signals to comprise multiple data bits, address bits or control bits, or a combination thereof.

15. A device comprising:

a plurality of processing cores to execute as a multi-core lockstep computing device; and a built-in test (BIST) unit to execute a BIST procedure based, at least in part, on one or more indicators of one or more potential errors in the multi-core lockstep computing device, the one or more indicators of the one or more potential errors to be based, at least in part on observations of output signals generated by at least two of the plurality of processing cores, wherein the one or more indicators to indicate at least locations of the one or more potential errors in the at least two processing cores, and one or more likelihood scores associated with the locations of the one or more potential errors.

16. The device of claim 15, wherein the one or more indicators further to indicate types of errors as soft errors or hard errors.

17. The device of claim 15, wherein the one or more indicators of the one or more potential errors to be determined based, at least in part, on divergences of observations of output signals between or among the two or more processing cores.

18. The device of claim 15, wherein the multi-core lockstep computing device to be segmented into testable units, and wherein execution of the built-in self-test procedure further to comprise determination of an order to probe the testable units based, at least in part, on the indicators.

19. The device of claim 15, wherein the observations of output signals to comprise multiple data bits, address bits or control bits, or a combination thereof.

* * * * *